(12) United States Patent
Yamada et al.

(10) Patent No.: US 7,979,166 B2
(45) Date of Patent: Jul. 12, 2011

(54) GENERATION FACILITY MANAGEMENT SYSTEM

(75) Inventors: Kazuo Yamada, Nara (JP); Nobuhiro Fuke, Nara (JP); Takashi Fukushima, Nara (JP); Katsushi Kishimoto, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 578 days.

(21) Appl. No.: 11/587,938

(22) PCT Filed: Apr. 22, 2005

(86) PCT No.: PCT/JP2005/007703
§ 371 (c)(1),
(2), (4) Date: May 16, 2008

(87) PCT Pub. No.: WO2005/107033
PCT Pub. Date: Nov. 10, 2005

(65) Prior Publication Data
US 2008/0234871 A1 Sep. 25, 2008

(30) Foreign Application Priority Data
Apr. 28, 2004 (JP) .................................. 2004-133735

(51) Int. Cl.
*G06F 19/00* (2011.01)
(52) U.S. Cl. ..................... 700/291; 700/286; 700/288
(58) Field of Classification Search .................. 700/286, 700/288, 291; 8/286, 288, 291
See application file for complete search history.

(56) References Cited

U.S. PATENT DOCUMENTS

| | | | | |
|---|---|---|---|---|
| 5,924,486 A | * | 7/1999 | Ehlers et al. | 165/238 |
| 6,216,956 B1 | * | 4/2001 | Ehlers et al. | 236/47 |
| 6,673,479 B2 | * | 1/2004 | McArthur et al. | 429/513 |
| 7,418,428 B2 | * | 8/2008 | Ehlers et al. | 705/63 |
| 7,516,106 B2 | * | 4/2009 | Ehlers et al. | 705/412 |
| 2002/0132144 A1 | * | 9/2002 | McArthur et al. | 429/13 |
| 2004/0098142 A1 | * | 5/2004 | Warren et al. | 700/22 |

FOREIGN PATENT DOCUMENTS

| | | |
|---|---|---|
| JP | 2001-306755 | 11/2001 |
| JP | 2001-306839 | 11/2001 |
| JP | 2002-58159 | 2/2002 |
| JP | 2002-101554 | 4/2002 |
| JP | 2002-259505 | 9/2002 |
| JP | 2004-326375 | 11/2004 |

* cited by examiner

*Primary Examiner* — Michael D Masinick
(74) *Attorney, Agent, or Firm* — Nixon & Vanderhye P.C.

(57) ABSTRACT

The invention relates to a generation facility management system using natural energy, and an object of the invention is to promote introduction of a generation facility by giving a consideration for generated and consumed power.

The generation facility management system is characterized in including a generation facility using natural energy and a management server for managing power information on the generation facility, wherein the generation facility includes: an energy obtaining section for obtaining natural energy; a power generating section for generating power from the obtained natural energy; an information control section for creating generated power information on the power generated by the power generating section; and a communication section for transmitting the power information to the management server, and the management server includes an information management section for determining a consideration for the power information transmitted from the generation facility by using predetermined consideration information.

10 Claims, 6 Drawing Sheets

- NATURAL ENERGY SUPPORTING PRODUCT -

WE SUPPORT GENERATION FACILITIES USING NATURAL ENERGY. POWER GENERATION QUANTITY (POWER CONSUMPTION BY INSTALLER ITSELF AND POWER SALE POWER ARE EXCEPTED) OF THE GENERATION FACILITIES WE SUPPORT NOW CORRESPONDS TO 5% OF POWER QUANTITY NECESSARY FOR OUR BUSINESS ADMINISTRATION. (RATIO OF SUPPORTED POWER QUANTITY WITH RESPECT TO OUR POWER CONSUMPTION QUANTITY IS CALCULATED BASED ON THE RESULT IN FISCAL 2002)

FIG.5

FIG.6 even the power of time and season, when the value as the power is low, must be purchased at a flat
GENERATION FACILITY MANAGEMENT SYSTEM This application is the US national phase of international application PCT/JP2005/007703 filed 22 Apr. 2005, which designated the U.S. and claimed priority of JP 2004-133735 filed 28 Apr. 2004, the entire contents of each of which are hereby incorporated by reference.

TECHNICAL FIELD

The present invention relates to a generation facility management system for managing power generated by a generation facility with small environmental load, and particularly relates to the generation facility management system for managing power generated by natural energy. Further specifically, the present invention relates to the generation facility management system having a function capable of setting a value of the power generated by the generation facility with small environmental load and further the value of the power generated by natural energy.

BACKGROUND ART

From a growing consciousness on the environment in recent years, introduction of a generation facility using with small environmental load, particularly the generation facility using natural energy is promoted on a global basis. At present, introduction of these facilities has been promoted by overly or partially subsidized by support measures by subsidy of each country.

In order to expedite the subsidy to the generation facility with small environmental load and the generation facility by natural energy and energy saving, there is a suggestion such as collecting an environmental tax directly or indirectly to return the tax revenue newly to an environmental contribution. Therefore, the introduction of the generation facility with small environmental load would be expedited hereafter.

Meanwhile, in order to diffuse these generation facilities, by an effort such as increase of performance and reduction of cost by a company who develops, manufactures, and sells the generation facility, a price of the generation facility has been steadily reduced these years, and further by a power purchase menu at an economically profitable price and by a method such as improving economy as an overall system by using together the other energy saving equipment to assist the introduction of these generation facilities, a diffusion rate thereof has been steadily rising.

When power demand is paid more attention to, along with an improvement in convenience of various OA machineries, air conditioner facilities, and other household appliance articles, power consumption has been rising year by year, and further a load factor, which is a ratio of electric energy of a peak hour to an average electric power, has been deteriorated year by year. A deterioration of load factor involves a problem that a power company is required to maintain the generation facility for responding to peak power, and the generation facility cannot be effectively used. In addition, thermal power generation that can be easily started and stopped is mainly used as the generation facility for responding to load variation. Therefore, a discharge of $CO_2$ is large, compared to average all power, and this is not preferable from the viewpoint of an anti-environmental aspect. Therefore, various kinds of examinations and actions are tried to level a power load.

In addition, a conventional regulation is relaxed step-by-step by means of power liberalization hereafter, and the purchase of power from not only a power company but also an independent generation trader is enabled. Therefore, it appears that there arise various needs from environmental consciousness and a change of a system. Specifically, although the generation facility can not be held, there is a need of reducing an environmental load by raising the ratio of natural energy in the energy of self use, or there is a need of introducing the use of natural energy by the generation facility with small environmental load in one way or another.

In addition, in a special case involving a power sale, such as a large-scale generation facility like a green power fund and a green power paper, there is partly a mechanism of circulating an added value related to an environmental value of natural energy.

Patent Document 1 suggests a photovoltaic power generation management server for collecting information on a power generation and a power consumption, etc, preparing useful advice information for a cost cut, and providing it for a user.

Patent Document 1: Japanese Laid-Open Patent Publication No. 2003-259551 Patent Document 2 suggests a system capable of calculating and storing a greenhouse gas discharge, from an operative situation of facilities of a customer, and displaying its discharge.

Patent Document 2: Japanese Laid-Open Patent Publication No. 2004-326375

DISCLOSURE OF THE INVENTION

Problem to be Solved by the Invention

The spread of the generation facility with small environmental load and natural energy advance steadily. However, a generation cost including an introduction cost does not reach an equal level of the cost of a conventionally used generation facility. The fact is that the balance is offset by assistance received from a country or a self-governing body, a rate menu of a profitable condition provided by a power company or a burden of an individual person who has a high environmental consciousness.

Particularly, the user who holds small generation facility such as family use cannot receive a benefit of an advantageous rate menu directly from the power related to a power value of a self-consuming power part and the power consumed by the facility with natural energy. Instead, normally a usual case is that the consciousness of an installer on environmental contribution and convenience of an establishment construction compensate therefore.

Meanwhile, the user has not only a demand of not only the environmental contribution, but also a demand to collect an investment needed for installation as early as possible. Accordingly, in order to aim at a full-scale spread, such a demand of the user needs to be satisfied.

In the country, although there is a problem of the aforementioned deterioration of the load factor, there is no system of grasping the situation of the value of power wherein the generation facility affects a reduction of the load factor, and it is impossible to actually classify the power. Therefore, a problem is that a flat rate must be set by the power purchase menu, or the like.

From the viewpoint of the user having the generation facility, this causes a drawback to occur such that a high valuable power cannot be purchased but at a flat rate. Meanwhile, from the viewpoint of a stance of purchasing such a power, a drawback occurs such that even the power of time and season, when the value as the power is low, must be purchased at a flat rate, specifically at a rate setting that ignores a difference of generation cost by other generation facility.

At present, a diffusion rate is low, and therefore the aforementioned problem is not surfaced. However, when full-scale diffusion occurs in future, a system to evaluate in accordance with a value of such power may be necessary.

However, there is no system to collect basic information for evaluating the value of the power, namely, there is no facility management system for managing a power quantity corresponding to the value of the power.

In view of the above-described circumstances, the present invention is provided, and an object of the present invention is to provide a system capable of properly evaluating the value of the power generated by using the generation facility with small environmental load and natural energy, and capable of promoting the introduction of the generation facility using the generation facility with small environmental load and natural energy.

Means for Solving the Problem

The invention provides a generation facility management system including a generation facility using natural energy and a management server for managing power information on the generation facility, wherein the generation facility includes: an energy obtaining section for obtaining natural energy; a power generating section for generating power from the obtained natural energy; an information control section for creating generated power information on the power generated by the power generating section; and a communication section for transmitting the power information to the management server, and the management server includes an information management section for determining a consideration for the power information transmitted from the generation facility by using predetermined consideration information.

The invention also provides a generation facility management system including a generation facility using natural energy and a management server for managing power information on the generation facility, wherein the generation facility includes: an energy obtaining section for obtaining natural energy; a power generating section for generating power from the obtained natural energy; an information control section for creating consumed power information including generated power information on the power generated by the power generating section and information specifying a power consumption and a consumption form of the power; and a communication section for transmitting the power information to the management server, and the management server includes an information management section for determining a consideration for the power information transmitted from the generation facility by using predetermined consideration information.

The invention provides a generation facility management system including a generation facility using natural energy and being possessed by a subscriber and a management server for managing power information on the generation facility, wherein the generation facility includes: an energy obtaining section for obtaining natural energy; a power generating section for generating power from the obtained natural energy; a power consumption detecting means for detecting power quantity consumed out of the power generated by the power generating section; and a communication section for transmitting the power information including power consumption defined by the power consumption detecting means to the management server, and the management server includes: a subscriber information storage section storing the power information on the subscriber transmitted from the generation facility; a value acquisition intender information storage section storing consideration information associating the power information set by the value acquisition intender beforehand with the consideration; and an information management section for determining the consideration for the power consumption out of the stored power information on the subscriber by using the consideration information.

The invention provides a generation facility management system including a generation facility using natural energy and a management server for managing power information on the generation facility, wherein the generation facility includes: an energy obtaining section for obtaining natural energy; a power generating section for generating power from the obtained natural energy; and a communication section for transmitting generated power information on the power generated by the power generating section to the management server, and at least one of the generation facility and management server includes an information management section for determining a consideration for the generated power information by using predetermined consideration information.

The invention also provides a generation facility management system including a generation facility using natural energy and a management server for managing power information on the generation facility, and having an energy obtaining function to obtain the natural energy, a power generating function to generate power from the obtained natural energy, a storage function to store the power information on generation and consumption of the generated power, and an information management function to determine a consideration for the power information by using predetermined consideration information.

As described hereinafter, as the above-described generation facility, a generation facility with generally small environmental load, such as a power fuel cell, may be used, even though natural energy is not used therein.

The invention provides a generation facility using natural energy, including: an energy obtaining section for obtaining natural energy; a power generating section for generating power from the obtained natural energy; a power receiving section for receiving power from a commercial power source; a power detecting section for detecting whether power consumption is performed on the power generated by the power generating section or on the power received by the power receiving section; a storage section for storing the power quantity of the power consumption detected by the power detecting section by distinguishing between a first power consumption of the power generated by the power generating section and a second power consumption by the received power; and a communication section for transmitting the power information including the first and second power consumptions stored in the storage section to a management server connected through a network.

Further, the invention provides a management server in a generation facility, including: a communication section for receiving power information on the generation facility; a subscriber information storage section for storing the received power information for each subscriber; a value acquisition intender information storage section previously storing consideration information for associating the power information with a consideration for each value acquisition intender paying the consideration; and an information management section for determining the consideration corresponding to the received power information by using the consideration information, wherein the communication section reports that the consideration is determined to the subscriber transmitting the power information and the value acquisition intender setting the consideration.

Effect of the Invention

According to the present invention, a consideration is given to the generation facility with small environmental load whose value is not conventionally clear or to the power generated by using natural energy. Therefore, a preferred profit is given to both of a subscriber who possesses the aforementioned generation facilities and a trader (value acquisition intender) who acknowledges the value in such a self-generation and gives the consideration thereto, and thus the introduction of the generation facility using natural energy can be promoted.

In addition, since the consideration is given to the subscriber by classifying it by each piece of information, subscriber's consciousness of energy saving and energy creation can be raised.

DESCRIPTION OF THE REFERENCE NUMERALS

100 Photovoltaic generator
110 Solar cell array
120 Power conditioner
122 Operating section
124 Communication section
125 Control section
126 Data storage section
127 Operating section
128 Display section
140 Switch unit
142 Power detection sensor
150 User load
160 Power sale power meter
170 Power purchase power meter
200 Power company
202 Power company power distribution network
204 Terminal
300 Network
400 Management server
401 Information management section
402 Subscriber information database
404 Value acquisition intender information database
406 Value data storage section
408 Disclosed information storage section
500 Value acquisition intender
501 Terminal
502 Consumption power meter

BEST MODE FOR CARRYING OUT THE INVENTION

The above-described generation facility management system according to the invention may be configured such that the generated power information includes information for distinguishing among generation by a fuel cell, existence or absence of a thermoelectric supply system for the fuel cell, generation by a gas engine, photovoltaic power generation, wind power generation, microhydraulic power generation, and biomass power generation, and the consumed power information includes information for distinguishing among consumption using the power generated by the power generating section, consumption by reverse power flow to a system, and consumption by a facility possessed by a third person.

Further, the generation facility management system may be configured such that the consideration information includes the predetermined consideration for each power distinguished by the generated power information and consumed power information and a condition for obtaining the consideration, and, when the power information transmitted from the generation facility satisfies the condition for obtaining the prescribed consideration, the information management section determines to give the consideration corresponding to the condition.

The generation facility management system according to the invention may be configured such that the management server includes a disclosed information storage section storing disclosed information including the consideration information, and, when there are a plurality of pieces of consideration information stored in the value acquisition intender information storage section, the information management section selects all pieces of the consideration information associated with the power information received from the generation facility to allow the disclosed information including all pieces of the selected consideration information to be readable, and, when receiving information indicating that particular consideration information is selected out of the disclosed information readable by the subscriber of the generation facility, the consideration included in the selected consideration information is determined as a consideration for the subscriber.

Energy obtained by the energy obtaining section may be any one of photovoltaic power generation energy, wind power generation energy, biomass power generation energy, and microhydraulic power generation energy.

Further, in the generation facility according to the invention, the power information transmitted to the management server may include at least one of generation form information, generation time zone information, consumption distinction information, and identification information on the generation facility.

The consumption distinction information may include distinction at least one among consumption by using the power generated by the power generating section, consumption by using the power received by the power receiving section, consumption by power supply to a neighborhood facility, and consumption by reversing power.

Further, the invention provides a generation facility management system including a means for offsetting integral values of power quantity consumed by a user possessing the generation facility or a possession facility of a third person contracting with the user possessing it, and all or a part of power quantity used by an intender intending to acquire a value.

It is also provided a generation facility management system for managing a generation facility using natural energy and power information on the generation facility through a network, wherein the generation facility includes: an energy obtaining means for obtaining natural energy; a power generating means for generating power from the obtained natural energy; a means for creating generated power information on the power generated by the power generating means, and an information management means for setting a value based on the generated power information.

The generation facility may include: an energy obtaining means for obtaining natural energy; a power generating means for generating power from the obtained natural energy; a means for creating generated power information on the power generated by the power generating means; a means for creating consumed power information on the generated power; and an information management means for setting a value based on at least one of the generated power information and the consumed power information.

The generation facility may include: an energy obtaining means for obtaining natural energy; a power generating means for generating power from the obtained natural energy; a means for creating generated power information on the power generated by the power generating means; a means for creating consumed power information on the generated power; an information management means for setting a value based on at least one of the generated power information and the consumed power information; a means for allowing consideration information exchangeable with the set value to be readable through the network; and a means for comparing and determining whether or not the value and a consideration are exchangeable.

The consumed power information may include information for distinguishing the power generated by the power generating section between consumption by reverse power flow to a power system and the other consumption.

The generated power information may include at least information on time of generating power, and the consumed power information includes information on time of consuming the power generated by the power generating section.

The generation facility management system may further include a means for integrating a power quantity obtained by classifying and integrating the power generated by the generation facility based on at least one of the generated power information and the consumed power information, and a used quantity of the power consumed by a facility used by a third person other than a user possessing the generation facility, and a means for comparing and offsetting the power quantity and the used quantity.

<Structure of a Generation Facility with Small Environmental Load>

The invention provides a generation facility management system including a generation facility with small environmental load and a management server for managing power information on the generation facility, wherein the generation facility includes: a power generating section for generating power; an information control section for creating generated power information on the power generated by the power generating section; and a communication section for transmitting the power information to the management server, and the management server includes an information management section for determining a consideration for the power information transmitted from the generation facility by using predetermined consideration information.

The invention also provides a generation facility management system including a generation facility with small environmental load and a management server for managing power information on the generation facility, wherein the generation facility includes: a power generating section for generating power; an information control section for creating consumed power information including generated power information on the power generated by the power generating section and information specifying a power consumption and a consumption form of the power; and a communication section for transmitting the power information to the management server, and the management server includes an information management section for determining a consideration for the power information transmitted from the generation facility by using predetermined consideration information.

A generation facility management system according to the invention is characterized in including a generation facility with small environmental load and a management server for managing power information on the generation facility, wherein the generation facility includes: a power generating section for generating power; a power consumption detecting means for detecting power quantity consumed by a facility of a subscriber out of the power generated by the power generating section; and a communication section for transmitting the power information including the power consumption defined by the power consumption detecting means to the management server, and the management server includes: a subscriber information storage section storing the power information on the subscriber transmitted from the generation facility; a value acquisition intender information storage section storing consideration information associating the power information set by the value acquisition intender beforehand with the consideration; and an information management section for determining the consideration for the power consumption out of the stored power information on the subscriber by using the consideration information.

The invention provides a generation facility management system for managing a generation facility with small environmental load and power information on the generation facility through a network, wherein the generation facility includes: a power generating means for generating power; a means for creating generated power information on the power generated by the power generating means; and an information management means for setting a value based on the generated power information.

The invention provides a generation facility management system for managing a generation facility with small environmental load and power information on the generation facility through a network, wherein the generation facility includes: a power generating means for generating power; a means for creating generated power information on the power generated by the power generating means; a means for creating consumed power information on the generated power; and an information management means for setting a value based on at least one of the generated power information and the consumed power information.

The invention provides a generation facility management system for managing a generation facility with small environmental load and power information on the generation facility through a network, wherein the generation facility includes: a power generating means for generating power; a means for creating generated power information on the power generated by the power generating means; a means for creating consumed power information on the generated power; an information management means for setting a value based on at least one of the generated power information and the consumed power information; a means for allowing consideration information exchangeable with the set value to be readable through the network; and a means for comparing and determining whether or not the value and a consideration are exchangeable.

The invention provides a generation facility management system including a generation facility with small environmental load and a management server for managing power information on the generation facility, wherein the generation facility includes: a power generating section for generating power; and a communication section for transmitting generated power information on the power generated by the power generating section to the management server, and at least one of the generation facility, management server, and a network terminal includes an information management section for determining a consideration for the generated power information by using predetermined consideration information.

The invention provides a generation facility management system including at least a generation facility with small environmental load and a management server for managing power information on the generation facility, and having a power generating function to generate power; a storage function to store the power information on generation and consumption of the generated power, and an information management function to determine a consideration for the power information by using predetermined consideration information.

Further, the invention provides a generation facility using natural energy, including: a power generating section for generating power by a generation system with small environmental load; a power receiving section for receiving power from a commercial power source; a power detecting section for detecting power consumption of the power generated by the power generating section; a storage section for storing power information on the power consumption detected by the power detecting section; and a communication section for transmitting the power information stored in the storage section to a management server connected through a network.

<Description of Generation Facility, Generation Form, Consumption Form and the Like>

In the present invention, as a typical generation facility with small environmental load, there are given examples such as a thermoelectric supply system in which a fuel cell and a gas engine are used.

Also, as a typical generation facility using natural energy, there are given examples such as a photovoltaic power generator and a wind power generator, and a fuel cell using biomass, and so forth, and a facility scale does not have a limit particularly.

However, in a case of a large-scale generation, transaction of its environmental value can be easily performed independently. Therefore, the present invention is particularly effective in a case of a coexistence of small systems in which buying and selling of value is difficult independently. As the small system, the generation facilities of 20 kW or less, and further 10 kW or less used in a general family are given as an example. Utilization of such small systems is particularly effective in a state in which a plurality of different generation facilities of their owner are connected by a network with a scale of more than several thousand of them.

Also, the generation facility is installed in every building such as a house of a single-family house, an apartment, and building, or it is installed as street lights of a public road. Meanwhile, a management server, for example, adds up power values of natural energy and is installed in companies who intermediate between a provider of the value and an acquisition intender of the value. Both of them are connected through networks such as Internet or a dedicated line.

In the present invention, as described above, it appears that the "generation form" includes at least four forms (photovoltaic power generation, wind power generation, biomass power generation, and Microhydraulic power generation), but the present invention is not limited thereto. In addition, although a consideration is determined based on the power information in the management server, the information specifying the generation form is also used as a factor of determining the value. As the information specifying the generation form, examples are given such as the information on distinguishing the kind of generation using natural energy, and the information on distinguishing a geographical condition of the generation facility and the time zone of generating the power, for example.

For example, when the power is generated, whereby a third person can be supplied with the power in big time of power demand, its value is set to be large.

It appears that the "consumption form" includes (1) consumption by using power occurred by a power generating section, (2) consumption by power supply to neighborhood facilities, (3) consumption by reverse power flow to a grid, and (4) consumption by facilities connected to the other generation facilities owned by the third person.

Here, the power generated by the power generating section means the power generated by the generation facility with small environmental load and by using natural energy, and the above description of the (1) consumption by using power occurred by a power generating section means a consumption form (called self-consumption) such as consuming the power with self-possessing electric appliances.

Both of the above descriptions (2) and (3) do not mean the self-consumption with self-possessing facilities, but can be targets to give the consideration, in the point of contributing to environmental safeguard by allowing others to use the generation facility with small environmental load and the power generated by natural energy. However, in the description (3), when the power including contribution degree to environment is sold to a power company, it does not become the target to give the consideration.

The consumption form of the description (4) means the consumption in a case that although not possessing the generation facility by oneself, the one invests in the generation facility owned by a third person, and when the third person consumes the power, this consumption is regarded as self-consumption. In other words, it means a use form in which a person who really owns the generation facility and consumes the power, and a person who contacts with the management system and receives the consideration are different ones.

By such a consumption form, even in the case of consuming the power generated by using the generation facility with small environmental load and natural energy, the contribution degree to the environmental safeguard becomes different. Therefore, the information distinguishing the kind of the consumption form, magnitude of power consumption, and a power consumption time zone (information specifying the consumption form) is generated, and the consideration can be set with reference to the information thus generated.

For example, when the power is consumed by using an independent generation facility with small environmental load and natural energy in big time of power demand, for example, a burden of an electric power system is reduced judging from an electric power system, and therefore the value can be set to be large.

In addition, the consumption form is not limited to the above-described consumption forms, but various forms can be considered. Even when electrical power is consumed with facilities of a building of oneself, if discrimination can be made between the consumption by facilities required for a normal life (such as a refrigerator), and the consumption which is unnecessary for minimum life and the consumption by the facilities (such as an amusement and game) considered to be able to save consuming if a user endures, it can be considered that different considerations can be set between the above consumptions. Also, even when it is difficult to minutely set the considerations for the above consumptions, it is possible that the power consumption is set to several phases, and the consideration is set to each of them.

Further, it is also possible that a difference in consideration is given, depending on a contract content between an owner (subscriber) of the generation facility, the provider of the management system, the value acquisition intender, or the power company. Therefore, the information on the contract content may be included in the power information.

For example, in a contact of a power sale, the information such as a contract period for power sale, a time zone of power sale, a maximum power for sale may be included in the power information. Also, in order to distinguish the consideration by the contract content such as presence of power supply to neighborhood facilities, a setting method of the value of power, and the kind of a representation supplier, the information on these contract contents may be included in the power information.

In addition, "consideration information" means the consideration given to each power distinguished by power generation or the consumption form of the power generation in accordance with an extent of contribution to environmental safeguard and burden reduction to an electric power system, and it corresponds to value information on the power firstly introduced by the present invention. For example, when the power is consumed by the generation facility using natural energy, it appears that the consumption form includes the aforementioned various forms. However, when the consumption contributes to environmental improvement, or contributes to load reduction in the electric power system, the value is recognized, and the value can be specified if the extent of contribution is specified by managing the generated power information and consumed power information.

The consideration information is obtained by digitizing the value, and is constituted by the consideration and conditions for obtaining the consideration. An article, money, credit deposit ticket, and a contribution point, etc, given corresponding to the power consumption correspond to the consideration. The consideration information is given in the form of showing a condition of the consideration (called a value acquisition condition), and for example, the consideration information is data obtained by digitizing and encoding the information such that when the condition of "A" is satisfied for the power consumption, an article (consideration) of "B" is given without charge. An explanation will be given in detail later.

When a fixed consideration is determined for each accumulated power consumption after self-generating power is classified by the consumption form, the information for distinguishing the power consumption generated during a fixed period of time and consumption form may be added and transmitted to the management server on the side of the generation facility, and at the management server, the power consumption may be accumulated by each consumption form. Alternately, the power consumption may be accumulated by each consumption form on the side of the generation facility, and the power consumption thus accumulated may be transmitted to the management server for each consumption form, whenever a fixed quantity is exceeded.

Every transmission procedure (protocol) and communication network between the generation facility and the management server used at present may be used, which is not specifically limited. However, in sufficient consideration of a compatibility of communication, confidentiality, and speed, an appropriate one between the generation facility and the management server should be selected.

An embodiment as will be described hereunder shows a generation facility management system with a use of sunlight. Here, the photovoltaic power generation facility corresponds to the generation facility, and a solar cell array corresponds to an energy obtaining section of the generation facility. The power generating section corresponds to a power conditioner, and an information control section corresponds to a control section. A power consumption detecting means corresponds to a power detection sensor.

In addition, in the management server, a subscriber information storage section corresponds to a subscriber information database, and a value acquisition intender information storage section corresponds to a value acquisition intender information database. A power reception section is a part for receiving the power supplied from the power company, and includes a power purchase power meter for measuring the power thus received.

The present invention will be explained in detail based on the drawings. Incidentally, the present invention is not limited thereto.

<Structure of Generation Facility Management System>

Figure 1:
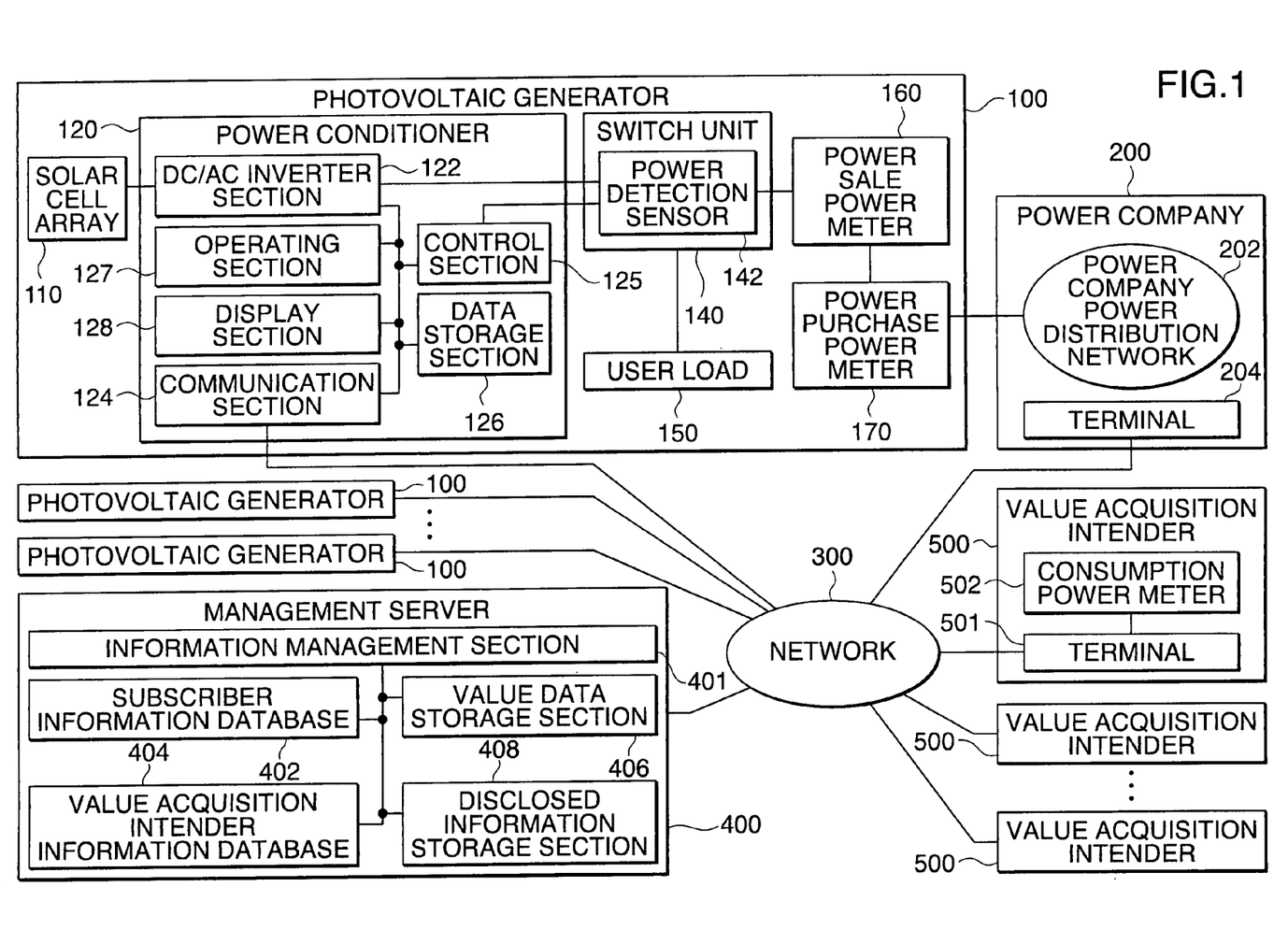
FIG. 1 is a block diagram showing an overall structure of an embodiment of a generation facility management system of the present invention.

FIG. 1 shows an entire constitutional block diagram of an embodiment of the generation facility management system using natural energy of the present invention.

In the embodiment described hereunder, the generation facility management system using sunlight as natural energy is used, but the embodiment is not limited thereto.

The generation facility management system of the present invention is mainly constituted of a photovoltaic generator 100 and a management server 400, and includes a terminal 204 owned by a power company 200, a power company power distribution network 202, and a terminal 205 owned by a value acquisition intender 500.

Such device 100, server 400, and terminals (204 and 205) are connected through a network 300 such as Internet.

A photovoltaic power generation system installed for a user's house, every building such as apartments, or a photovoltaic power system installed for the purpose of power generation, and an illumination with parallel installation of the photovoltaic power generation of self-consumption type, correspond to the photovoltaic generator 100.

The photovoltaic generator 100 is a device for generating the power by receiving the sunlight, and managing the information on the power, and is mainly constituted of a solar cell array 110, a power conditioner 120, a switch unit 140, user load 150, and two kinds of power meters (160 and 170).

Here, the solar cell array 110 is the generator for generating the power when the sunlight is received, wherein existing various kinds of panels can be used, and acquires sunlight energy as a direct current.

The power conditioner 120 is the part for generating the power based on the direct current extracted from the solar cell array 110 and controlling and managing the information on the power quantity.

The switch unit 140 is the part for supplying the power generated in the solar cell array and a commercial power supplied from the power company to each user load 150.

The user load 150 means electric apparatuses used by a user (such as PC and television) and neighborhood facilities and attached facilities that consume the power obtained by the solar light generation.

The power meter is composed of a power sale power meter 160 for measuring the power for selling to the power company 200 (called a power sale power), and a power purchase power meter 170 for measuring the power for purchasing the power from the power company 200 conversely (called a power purchase power).

As shown in FIG. 1, the power conditioner 120 is mainly constituted of a DC/AC inverter section 122 for converting the direct current extracted from the solar cell array 110 into an alternating current, a data storage section 126 for storing the information related to the power, a communication section 124 for performing data communication by being connected to the network 300, an operating section 127 for being inputted data by a user, a display section 128 for displaying the data, and a control section 125 for controlling an operation of each constituent element.

Here, for example, the power generation generated in the solar cell array 110, the time when the power is generated, the power consumption consumed by the user load 150, time required for consuming the power, the consumption form, the power sale power quantity, and the time when the power sale is performed, are stored in the data storage section 126. Such storage information is transmitted to the management server 400 through the network 300.

The switch unit 140 is connected to the DC/AC inverter section 122, the power sale power meter 160, and the user load 150, and the switch unit 140 has a function to detect the power consumption, and has a power detection sensor 142 for detecting the power (power consumption), etc, consumed by the user load 150.

The power detection sensor 142 detects separately each of the power consumed by the user load 150 out of the power (power generation) generated by the solar cell array 110, and the power quantity (power sale power quantity) which is sold through the power company's power distribution network 202 out of the generating power.

The switch unit 140 further has a function to communicate with a consumed household electrical appliance, and it is also possible to add a function to manage the power consumption for every consumption facility.

The power sale power meter 160 is connected to the power detection sensor 142 and the power purchase power meter 170, and measures the quantity of the power to be sold to the power company.

The power purchase power meter 170 is connected to the power sale power meter 160 and the power company power distribution network 202, and measures the power quantity of the power purchased from the power company.

Keyboard and mouse, etc, are used in the operating section 127, and a display section such as CRT and LCD is used in the display section 128.

The communication section 124 is the part of performing connection control and sending/receiving data to the network 300, and is the part having the function to perform communication by TCP/IP to the Internet. Although not shown, the management server 400 and terminals (204, 501) have also a similar communication function as that of the communication section 124.

The power company 200 is connected to the network 300 other than the distribution network 202 for supplying a so-called commercial power to the user, and has the terminal 204 that performs data communication with the photovoltaic generator 100 and the management server 400.

The terminal 204 receives the information stored in the management server 400, and gives a control instruction to the photovoltaic generator 100. For example, when certain abnormal information on the photovoltaic generator 100 is obtained from the management server 400, a stop instruction of a generation function is transmitted to the control section 125 of the photovoltaic generator 100 whose abnormality is generated from this terminal 204.

The management server 400 adds up power values of natural energy, for example, which is installed in the company who intermediates between the value provider and the value acquisition intender, and serves as a device to manage and provide the information on the photovoltaic generator 100 and the subscriber.

As shown in FIG. 1, the management server 400 is mainly constituted of information storage sections (402, 404, 406, 408) for storing each kind of information, and an information management section 401 for acquiring, processing, and providing such information.

The information storage section includes a subscriber information database 402 storing the information on the subscriber who installs the photovoltaic generator 100 (a name, an address, device ID number, generated power information, consumed power information, and personal hobby taste, etc.), a value acquisition intender information database 404 storing the information on an intender (value acquisition intender) who intends to acquire a power value generated by the generation facility using natural energy (a name, an address, a requesting item, an acquisition requesting power, an acquisition power unit, and the consideration that can be provided for acquired power, etc.), and a disclosed information storage section 408 storing disclosed information that can be read by the subscriber.

The data of the value of power means, for example, the data such as information on the degree of environmental contribution, information on the contribution to carbon dioxide reduction, information on expense for the reduction of a generation cost, and the data of the value of power is the data used for converting (processing) the information on the power consumption and power generation transmitted from the photovoltaic generator of the subscriber into the information on the consideration.

The disclosed information means, for example, generated power information and power value data of the subscriber, and acquisition consideration information on the value acquisition intender, and the disclosed information is the information disclosed to a user of the system of this invention.

The information management section 401 of the management server 400 receives/transmits each kind of information to the photovoltaic generator 100, then performs processing such as classifying, evaluating, and determining the value of the power using the power information thus obtained, and generating and storing the consideration information and generating and storing the disclosed information.

The subscriber information stored in the management server 400 is previously stored in the database 402, by using an input device not shown or by downloading from the photovoltaic generator 100 by communication, before the subscriber uses the management system. The value acquisition intender information is similarly previously stored in the database 404 before a use of the system starts.

Figure 6:
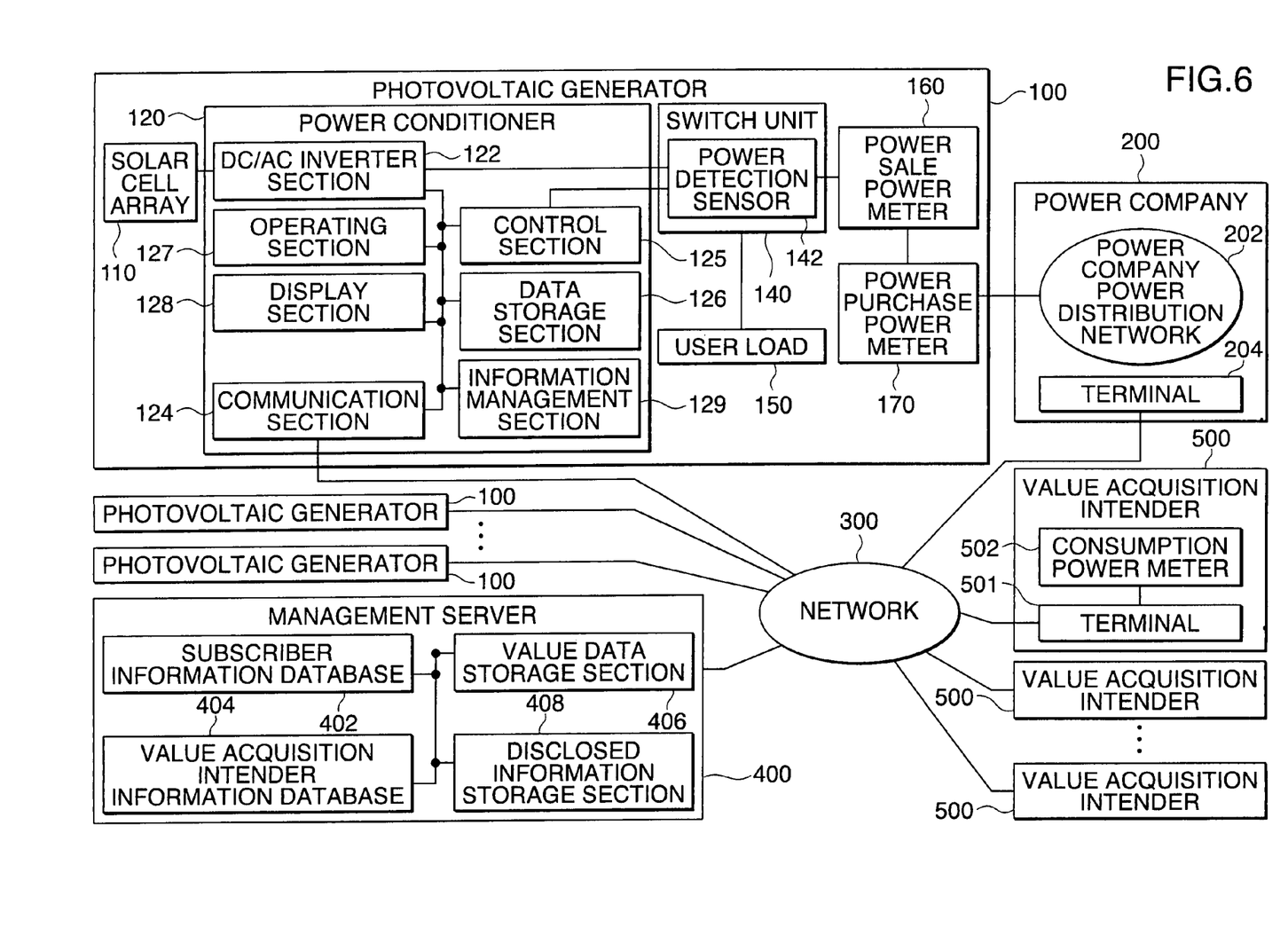
FIG. 6 is a block diagram showing the overall structure of other embodiment of the generation facility management system of the present invention.

The information management section as described above may be provided in each generation facility (photovoltaic generator 100) as shown in FIG. 6, instead of providing it in the management server 400 (129 of FIG. 6). In this case, the value of the power can be determined in a self-contained manner in the generation facility, and the management server 400 connected through network can see the consideration thus determined.

The value acquisition intender 500 means the provider (such as a company, business connection, power trader, etc.) who founds the value in generated power and applies the consideration for the value of the power. The value acquisition intender 500 has a terminal 501 and a consumption power meter 502 for connecting to the management server 400 through a network 300. Here, the terminal 501 functions to give the requested information on itself to the management server 400, and obtains the disclosed information from the management server 400. Also, the consumption power meter 502 functions to measure the power quantity actually used by the value acquisition intender, and for example, is used for offsetting the power of the value provider and the power of the value acquisition intender.

The management server 400 and the terminals (204, 501) are also constituted of a personal computer and a work station, and its information processing function is realized by operating a microcomputer based on a control program incorporated in a ROM, etc.

<Processing by Generation Facility Management System>

Figure 2:
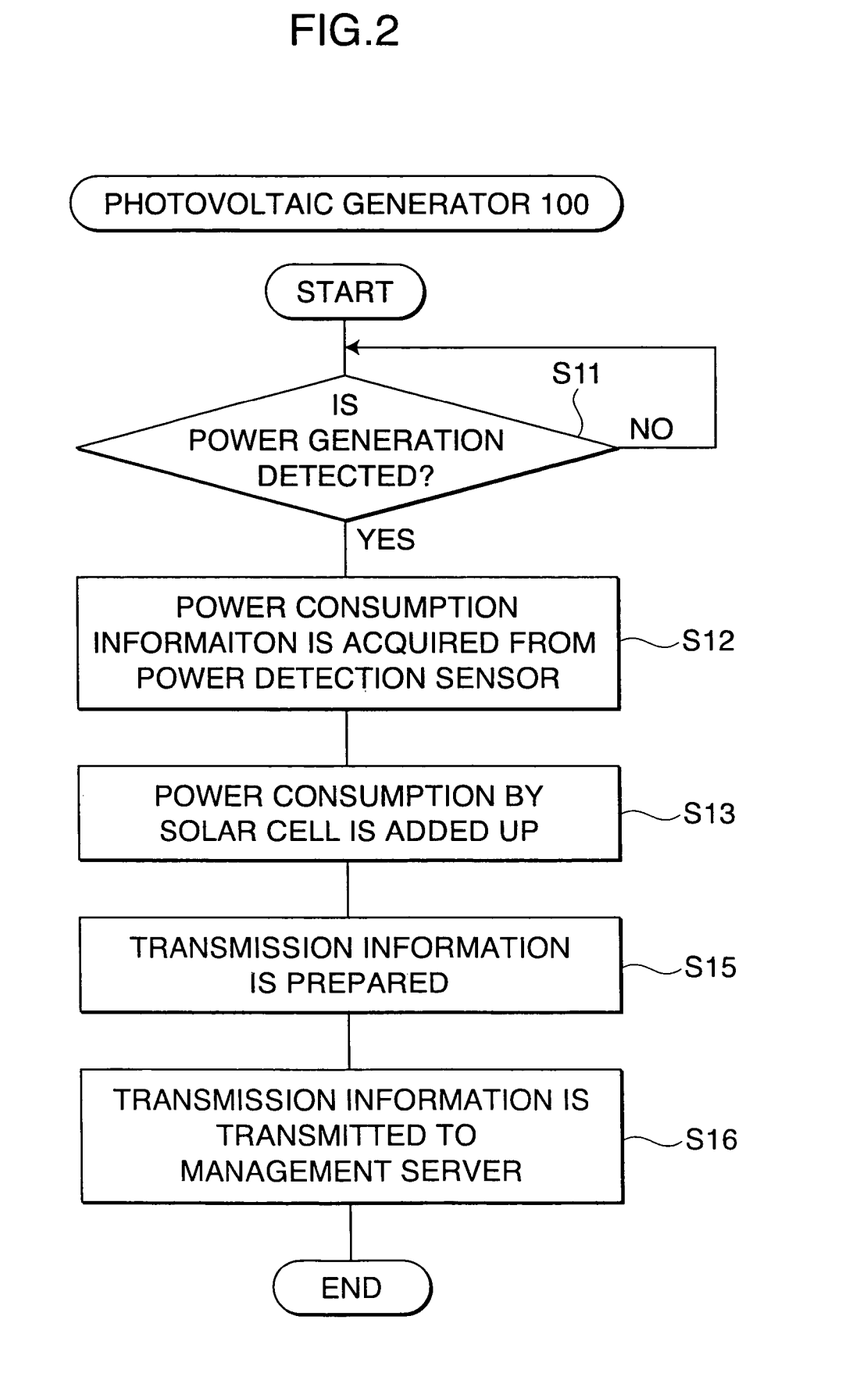
FIG. 2 is a flowchart of acquisition and generation processing of power information on generation facility (a photovoltaic generator) of the present invention.

First, an explanation will be given to acquisition and generation processing of the power information on the photovoltaic generator 100.

FIG. 2 shows a flowchart of the processing of the photovoltaic generator 100 of the present invention.

When the power is generated in the photovoltaic array 110, the power is transmitted to a DC/AC inverter section 122 as a direct current, and therefore the control section 125 detects a current change thus occurred. By existence/nonexistence of such a current detection, whether or not there is a non-commercial power generation by sunlight is confirmed. In step S11 of FIG. 2, the control section 125 confirms whether or not there is a power generation by sunlight.

When the control section 125 confirms the power generation, the information on the power consumption is acquired from the power detection sensor 142 (step S12).

The information on the power consumption out of the power provided by the photovoltaic power generation as described above can be obtained.

Next, in step S13, when the information on the power consumption is acquired, the control section 125 stores it in the data storage section 126. Here, when it is so assumed that the power quantity is added up per every one day and transmitted to the management server 400, a first power consumption is added for every generation of the power consumption, and the power quantity of one day is added up. However, a transmission unit is not limited to per every one day, but may be per every one week or per every one month.

In step S15, the control section 125 prepares transmission information by using the information on the power consumption thus added up. The transmission information is constituted of identification information on the subscriber who possesses the photovoltaic generator 100, power generation, power consumption, time required for consuming, consumption form, power sale power quantity, and the time required for selling power.

In step S16, the communication section 124 transmits the transmission information thus prepared to the management server 400 through the network 300. This transmission information corresponds to the aforementioned power information.

<Information Processing in Management Server>

Next, the information processing in the management server 400 will be explained.

Figure 3:
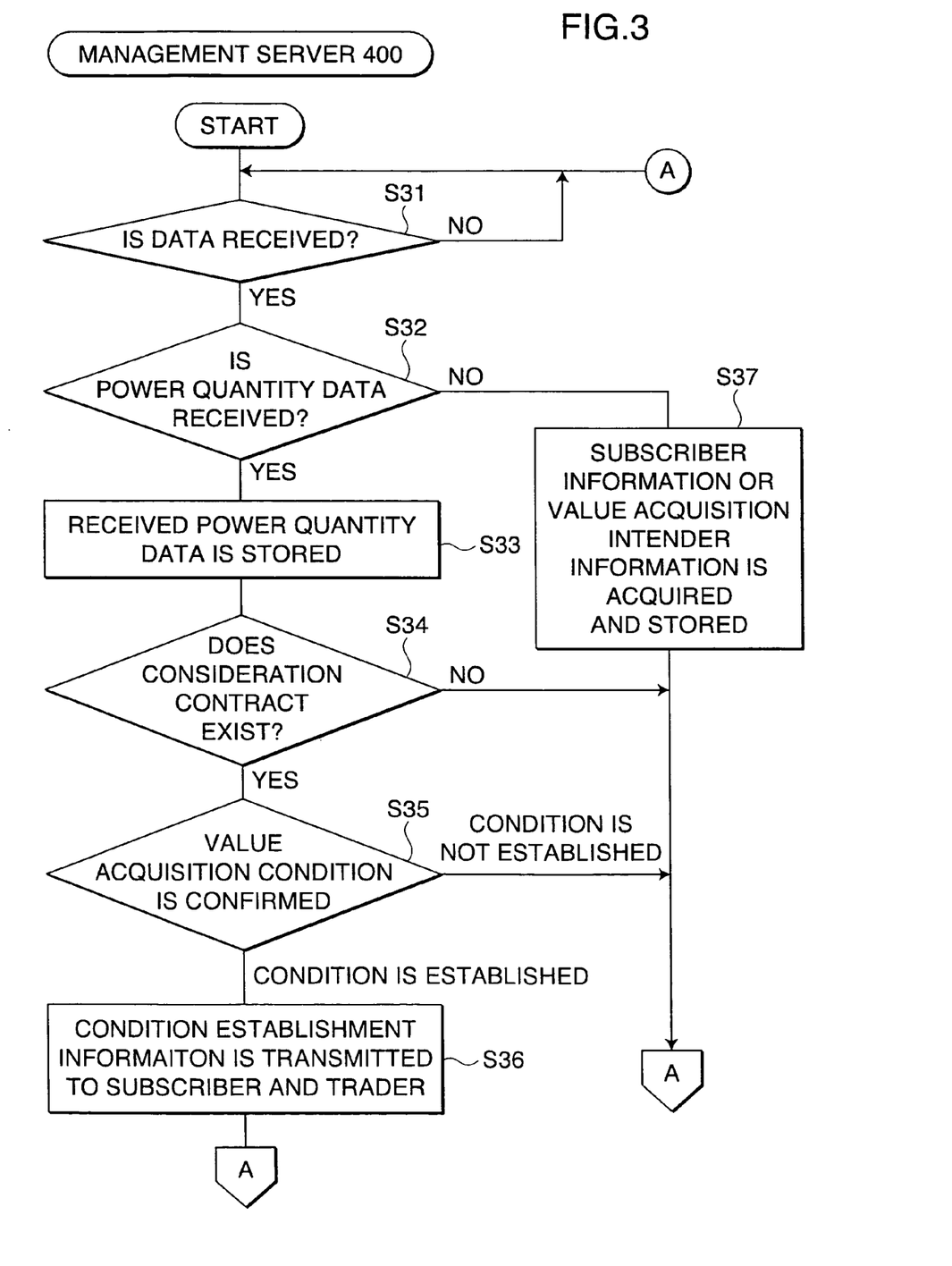
FIG. 3 is a flowchart of information processing in a management server of the present invention.

FIG. 3 shows a schematic flowchart of an embodiment of the information processing by the management server 400 of the present invention. This information processing is performed by the information management section 401.

First, in step S31, whether or not there is reception data is confirmed, and when the data is received from the terminal 501 of the photovoltaic generator 100 or the value acquisition intender 500, the processing is advanced to step S32. In step S32, content of the data thus received is confirmed, and whether or not it is power quantity data is determined. When it is the power quantity data, the processing is advanced to step S33, and when it is the other data, the processing is advanced to step S37.

In step S33, the information management section 401 analyzes the power quantity data thus received, and stores it in a prescribed storage section or database. For example, when the transmission information including the power quantity data is transmitted from the photovoltaic generator 100 by the processing of FIG. 2, the subscriber number included in the transmission information is confirmed, and the information on the power consumption thus received is stored in a storage region related to the subscriber in the subscriber information database.

Meanwhile, when the data thus received is not the power quantity data, in step S37, it is acquired and stored as the subscriber information or value acquisition intender information. For example, when the information for specifying the subscriber oneself and contract information on value acquisition of the subscriber are received, the information thus received is stored in the storage region of the information on the subscriber in the subscriber information database 402.

In addition, when the information specifying the value acquisition intender oneself, consideration information given by the intender, and advertisement information or the like is received, the information thus received is stored in the storage region of the information on the intender, of the value acquisition intender information database 404.

In step S37, after the information is acquired and stored, the processing is returned to step S31, to become in a stand-by state of data reception.

In step S33, after the power quantity data is stored, the processing is advanced to step S34, and the subscriber of the power quantity data confirms whether or not a consideration contract is effective. When the contract is effective, the processing is advanced to step S35, and when it is not effective, the processing is returned to step S31. Here, the consideration contract means the contract of value acquisition corresponding to the power quantity, concluded between a subscriber A and a trader B who is a power value acquisition intender.

The information on the consideration contract is previously stored in the subscriber information database 402 by the processing of step S37. For example, in step S34, if there is the information showing that the contract between the subscriber A of the received power quantity data and the trader B is effective, the processing is advanced to step S35.

In step S35, the content of the consideration contract is checked, to confirm whether or not a current state of the subscriber satisfies a value acquisition condition. Here, by using the information stored in two databases 402 and 404 and in the value data storage section 406, the power quantity data thus received is processed, to determine whether or not the content (condition) of the consideration contract is satisfied.

When the value acquisition condition is established, the processing is advanced to step S36, and based on the content of the consideration contract, condition establishment information showing establishment of condition is transmitted to both of the subscriber A and the trader B who make consideration contract. When the value acquisition condition is not established, the processing is returned to step S31.

Confirmation of the value acquisition condition in step S35 will be specifically explained.

For example, the following information on the subscriber A is assumed to be stored in the subscriber information database 402.

(A-1) Personal information on the subscriber A: Name, address, ID number, and telephone number (A-2) Consideration contract information: Name of contract trader B, ID number of the trader (A-3) Self power generation of the current self-consumption: 980 kWh Also, the following information on the name of the contract trader B is assumed to be stored in the value acquisition intender information database 404.

(B-1): Personal information on the name of the trader B: Name, address, and ID number.

(B-2): Acquisition request total power quantity=30000 kWh (B-3): Consideration information:
 (1) Target article=A tableware set for camping
 (2) Power quantity 1000 kWh required for exchange 30 subscribers of first arrival
 (3) The subscriber admits to offset the self power consumption out of the self power generation and the power used in manufacturing a product by the trader B, and to use the result in a sales promotion activity.

Figure 4:
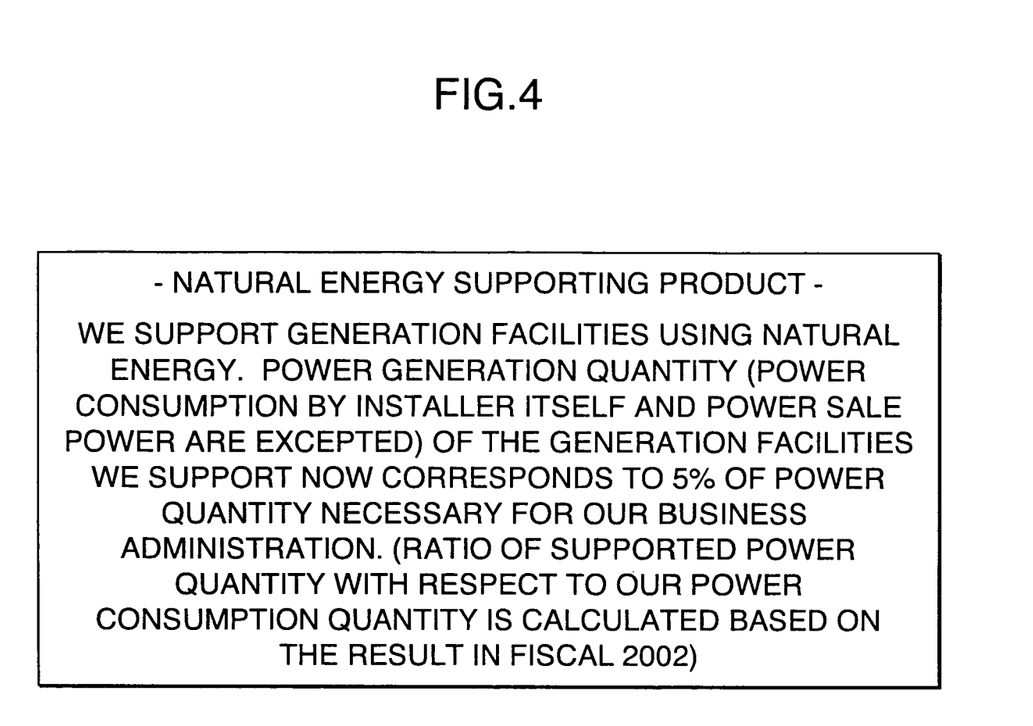
FIG. 4 is an explanatory view of an embodiment of a label which is affixed to the generation facility.

Here, a designated label means the label as shown in FIG. 4, for example, and this label is stuck on the one's own company's product for the sales promotion of one's own company's product, and the product thus stuck with label is sold. Meanwhile, the trader B promises to provide the product of the trader B (such as tableware set for camping) to the subscriber.

Here, as a specific example, the content of the consideration contract between the subscriber A and the trader B is assumed to be "when the self power generation of self-consumption reaches 1000 kWh in total, tableware set for camping is provided".

In such a circumstance, in step S35, the current self power generation quantity of self-consumption of the subscriber A and (1000 kWh) which is a value acquisition condition of the consideration contract content of the trader B are compared.

In the aforementioned condition setting (A-3), the current self power generation (980 kWh) of the subscriber does not reach a total power quantity yet, and therefore the processing is returned to step S31 as it is.

Meanwhile, when the power consumption of the subscriber A is accumulated and the current power consumption reaches 1000 kWh, this means that the value acquisition condition (1000 kWh) previously set is exceeded. Therefore, by a comparison processing of step S35, the condition of the consideration contract is determined to be established.

In this case, the processing is advanced to step S36, and a message that the condition is established is reported to both of the subscriber A and the trader B.

Thereafter, the trader B who confirms the report of this condition establishment delivers promised tableware set for camping to the subscriber A.

Note that FIG. 4 shows the label expressing the power quantity that acquires value based on the results of the previous year (a part corresponding to 5%). However, by expressing the power quantity, with the power quantity determined based on the power quantity measured by the consumption power meter 502 described in FIG. 1 as a reference, display with a little time difference is enabled and this is preferable.

By performing a series of processing as described above, various profits can be given to those involved in the photovoltaic generation facility management system. For example, the user (corresponding to the subscriber A) who installs the photovoltaic generator 100 has not received the evaluation of the value regarding the power of self-consumption heretofore, even if he/she contributes to environmental improvement by generating the power by using the photovoltaic generation facility. However, by this system, the consideration (tableware set for camping) can be obtained.

In addition, when further more users introduce the facility because of obtaining the consideration, those who provide the photovoltaic generation facility can obtain an economic profit. Further, not only those who provide the photovoltaic power generation, but also a general trader (corresponding to the trader B) can publicize one's own company's product as actions such as environmental improvement by performing convincing advertising (corresponding to sticking of the label), to the user who is expected to purchase one's own company's product, instead of giving the consideration to the subscriber.

Note that in the above-described explanation, the determination of the value is performed in the server, but the determination of the value is not limited to the server, but can be performed by a system on the side of the generation facility and an individual terminal for reading the information, after seeing the data of the server.

In other words, the power consumption by the photovoltaic generation produces a new value, and an owner of the generation facility can obtain the consideration by having the value accepted, and the trader who purchases (acquires) the value can get the profit that the one's own company's product can be easily and efficiently publicized to the person who plans to purchase the product, instead of giving the consideration to the owner.

Note that the above-described specific example shows an example that the self power generation quantity of self-consumption and the trader obtains the consideration by offsetting the power of self-consumption and the power used in manufacturing the product by the trader B, out of the self power generation, under a condition of using it for appealing the environmental contribution. However, various values can be considered as a target of the value.

As an added value when the self power generation is consumed, for example the following case is considered.

(1) The value to the degree of the environmental improvement by performing power generation using natural energy.

(2) The value to the degree of contributing to discharge reduction of carbon dioxide ($CO_2$) or the like.

(3) The value to contribution to the reduction of the generation cost of a commercial power (such as operating expense and installment expense), by selling the power to the power company and contribution to load leveling.

Such values are digitized and previously stored in the data storage section 406.

The aforementioned value can be calculated by using the the self power consumption out of the self power generation, and for example, a point system is adopted, like setting 1 kWh as 1 point, and thus a financial value can be applied to the point. Further, the information on a time zone in which the power is generated and consumed is added, and the point can be minutely set based on the generated power information and the consumed power information, like setting 1 kW as 2 points for the power generated and consumed in a daytime of summer (a constant time range of a fixed period of time). In this way, when the point system is adopted, conversion of the power quantity to the point may be uniformly performed, or may be arbitrarily set by the value acquisition intender based on the profit of the value acquisition intender.

The trader B (value acquisition intender) may set an article, money, and a gold note, etc, to be given to the subscriber as a consideration, by the number of the points, for example.

Also, when such a value evaluation reference (1) is used, in step S35, in order to confirm the condition, by not using the power consumption but referring to the power information on the target power quantity, the process of converting (processing) the power consumption into data is performed, and thus the point is calculated and the point thus obtained and the previously set value acquisition condition may be compared.

In this way, digitized data stored in the value data storage section 406 is used for converting the power consumption into the aforementioned value data.

In addition, an element whereby the value is determined and the information such as an importance of the element may be stored in the value data storage section 406. In the aforementioned example, the time of generation and consumption is shown, but the kind of the generation facility and the consumption form are given as examples of other "element".

The "importance of an element" means a weighting of the evaluation, and a high importance is applied to the power generated in the daytime at the height of summer, and a low importance is applied to the power generation of the time zone with a little demand.

For example, the kind of the generation facility includes the photovoltaic power generation, wind power generation, a fuel cell using biomass, and microhydraulic power generation, or the like. The consumption form includes a generation time zone, an object of the power consumption, consumption time zone, and existence/non-existence of power supply to neighborhood facilities, or the like. These elements and importance are digitized and stored.

The received power information is added with the importance by the digitized element and importance information, and is converted into data which is compared in step S35.

If the aforementioned element and importance information are used, the magnitude of the value of the power consumption can be set, in consideration of factors such as not only the magnitude of the received power consumption but also the quality of the power consumption, consumption time zone, and a facility scale.

Accordingly, since the power consumption is converted into previously set value data, various kinds of considerations and profits can be given to the user and a related trader using the generation facility, and the introduction of the generation facility using natural energy can be expedited.

EMBODIMENT 1

Selection and Processing of Consideration

Next, an explanation will be given to a specific example of an embodiment wherein the subscriber selects any one of the considerations out of a plurality of considerations. Here, the following information is assumed to be previously stored in the information storage section of the management server 400.

Information Stored in Value Acquisition Intender Information Database 404
(1) Provider: The Trader B Who Manufactures and Sells Camping Equipment.
Condition: Support situation should be printed in a home page of environmental contribution.
Consideration: Free tableware set for camping is provided to self power consumption of 1000 kWh out of the self power generation.
Acquisition request power quantity: 30000 kWh (The first 30 people).
(2) Provider: Trader C Who Sells Flower Arrangement by Home Delivery.
Condition: Support situation should be printed in a home page of environmental contribution.
Consideration: When the self power consumption out of the self power generation is 1500 kWh, a seasonal flower should be delivered to the subscriber.
Acquisition request power quantity: 30000 kWh (the first 20 people)
(3) Provider: Trader D Who Runs a Resort Hotel.
Condition: Support situation should be printed in a home-page of environmental contribution.
Consideration: When the self power consumption out of the self power generation is 1000 kWh, lodging discount coupon of a resort hotel run by the trader oneself should be provided.
Acquisition request power quantity: 30000 kWh (The first 30 people).

Disclosed Information Stored in Disclosed Information Storage Section 408
(4) Consideration of the Trader B (Tableware Set for Camping)
(5) Consideration of the Trader C (Delivery of a Seasonal Flower)
(6) Consideration of the Trader D (Lodging Discount Coupon of the Resort Hotel)
(7) Current Exchangeable Accumulated Power Quantity of the Subscriber A.

Here, the disclosed information stored in the disclosed information storage section 408 is in a condition capable of being read if the management server 400 is accessed by at least the subscriber and the value acquisition intender.

Figure 5:
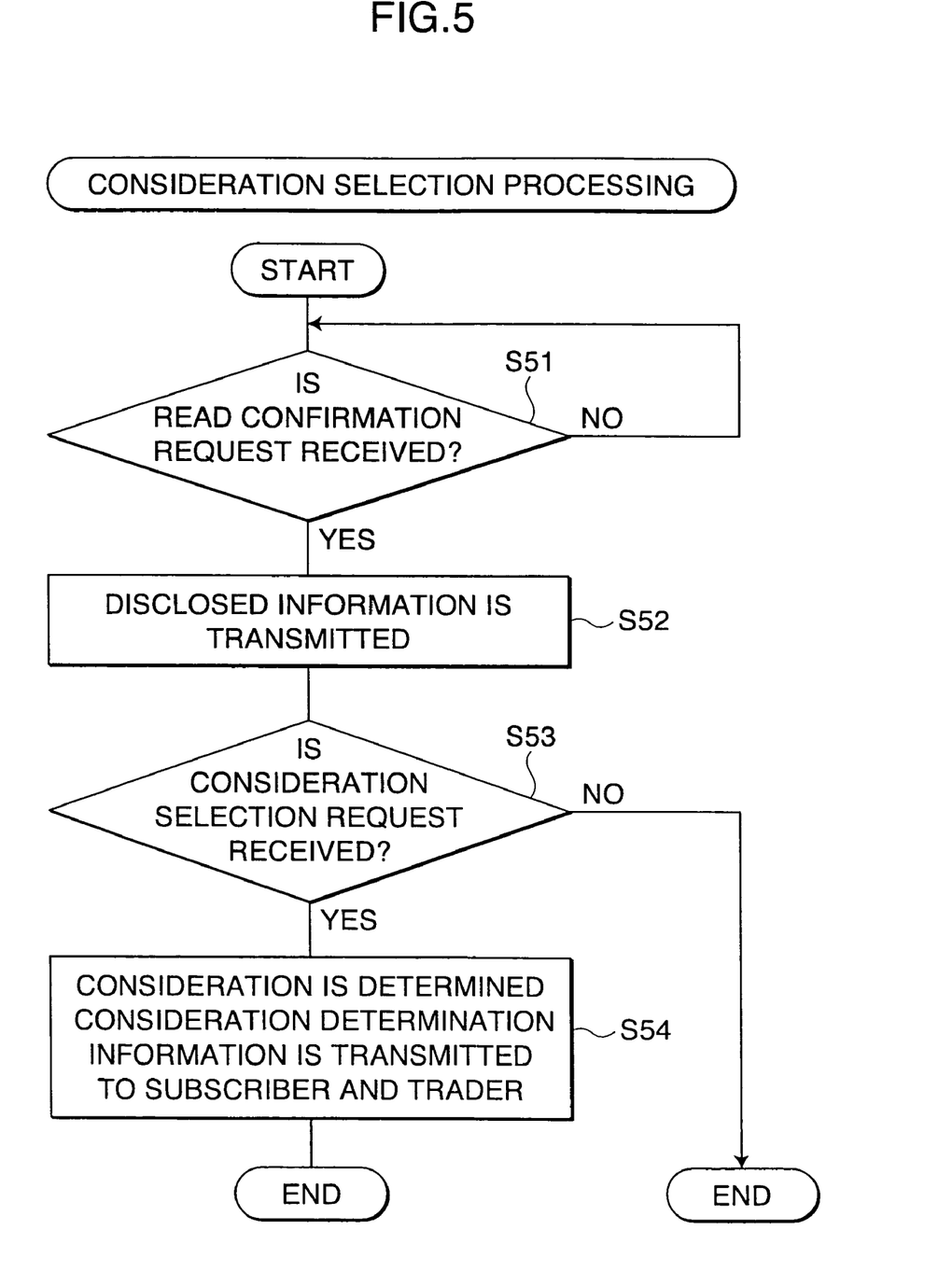
FIG. 5 is a flowchart of a selection processing of a consideration of the present invention.

FIG. 5 shows a flowchart of a selection processing of the consideration of the present invention.

Under the above-described circumstances, the subscriber A connects the photovoltaic generator 100 or the terminal of oneself to the management server 400, and performs a read confirmation request operation of the disclosed information. When the management server 400 receives the read confirmation request (step S51), the disclosed information on the subscriber A is transmitted to the subscriber A (step S52). The disclosed information thus transmitted is displayed on the terminal, etc. of the subscriber A. By this disclosed information, the subscriber A can confirm current first self power consumption. At this time, the power quantity that can be exchanged with the consideration stored in the disclosed information section 408 is assumed to be 1600 kWh.

In addition, the subscriber A, who confirms that the power quantity that can be exchanged with the current consideration is 1600 kWh, searches or confirms whether or not there is the consideration that can be acquired with this power consumption. When there are assumed to be three considerations as described in the aforementioned (4) to (6) that can be acquired with the power consumption of the subscriber A in the transmitted disclosed information, the subscriber A confirms that there is the consideration information provided by these three traders (B, C, D).

When there is a requested consideration out of these three pieces of consideration information, the subscriber A selects this consideration.

For example, the subscriber A performs an operation of selecting the lodging coupon of the trader D. By this operation, the selected information (consideration selection request) is transmitted to the management server 400. When the information management section 401 of the management server 400 receives this request (step S53), the exchange of the power consumption and the consideration between the subscriber A and the trader D is determined to be established, and consideration determination information, showing a message that a consideration exchange contract is established, is transmitted to the subscriber A and the trader D (step S54).

Then, the trader D, who confirms that the consideration exchange contract is established to the subscriber A, sends the lodging coupon of the resort hotel to the subscriber A.

As described above, when there are a plurality of exchangeable considerations to the power consumption of the subscriber A, all pieces of the consideration information are disclosed to the subscriber A. Therefore, the subscriber A can select a requested consideration.

EMBODIMENT 2

Specific Example of Investing to Facility of Third Person

Next, an explanation will be given to a specific example of acquiring the value and consideration defined by this application, by investing in the facility of the third person. It is assumed that there is a case of a plan to setting up 100 illumination machineries having the photovoltaic generation and a battery disposed side by side therein, in a main street reaching in the city hall of S-city. The illumination machinery accumulates the power generated in the daytime in a battery, and turns on the illumination in the night. The mechanism is that in case that the battery is fully charged when fine weather continues, a reverse power flow is performed to a system, and the power is sold. Further, the management system of the present invention is mounted on a street light, which is capable of performing a centralized management of 100 illumination machineries.

In setting up the street light, an expense required for setting up the street light of conventional type, and electric bill of ten years that can be reduced by the power generated by the photovoltaic generation were borne by the S-city. In addition, an investment applicant to facilities was invited to public participation for 100,000 yen/1 share (100 shares in total) for the balance of 100,000 yen/one street light between an amount of money paid and an amount of money that was necessary for the actual establishment. Those who invested in facilities have their names registered on street lights, and have a right to hold the environmental value of the power obtained by the photovoltaic power generation.

When a subscriber Y who holds the photovoltaic generation system of 3 kW in home is assumed to obtain the above-described information and purchase two shares for an open call for participants, the information on the subscriber Y is as follows.

(Y-1) Particular Information on the Subscriber Y: Name, address, ID Number, and Telephone Number
(Y-2) Consideration Contract Information: Unknown
(Y-3) Total of the Current Self Power Generation Out of Self Consumption: 1220 kWh
  Facility 1: 1000 kWh
  Facility 2: 220 kWh An exchange with the consideration can be performed in the same way as the aforementioned embodiment 1, other than using the above-described information.

In this case, the subscriber Y can exchange the value with the consideration corresponding to 1220 kWh. Here, the self-consumption of the facility 2 can be multiplied as the power used for turning on the street light, for example.

EMBODIMENT 3

Mutual Service with Different Type of Industry

Frequent flier programs and article acquisition by point system, and systems of conversion in cash that aimed at enclosure of a user, are spread in a card company, an airline, and various kinds of stores. A specific example of a mutual service with such a service will be explained. In this case, it is necessary to handle the power quantity as a common unit by converting the power quantity obtained by the power information into points, etc, based on each value information. The mutual service with a card company will be explained hereafter.

Power value 1 kWh=1 point
Amount of card use of J company 1 point per 10,000 yen
The information on a subscriber Z in a case of holding the photovoltaic generation system of 3 kW and paying purchase expense 2,000,000 yen of a new car by using a card of J company, is as follows.

(Z-1) Particular Information on the Subscriber Z: Name, Address, ID Number, and Telephone Number
(Z-2) Consideration Contract Information: Unknown
(Z-3) Current Exchangeable Points
  Facility 1: 1000 points (1000 kWh)
  Exchangeable points by use of a card: 200 points (an amount of use is 2,000,000 yen)

The exchange with the consideration is possible by the same method as that of the above-described embodiment 1, other than using the above-described subscriber information. When the subscriber Z uses the exchangeable points, the exchange with the consideration corresponding to 1200 point is possible.

EMBODIMENT 4

Creating Method of Other Value

Although the example assuming 1 to 1 business between the user who holds the power value and the trader who intends to acquire the value has been explained heretofore, a specific example of a creating method of the other value will be explained.

For example, a case is assumed, such that a plurality of considerations like the case explained in the embodiment 1 are carried on a home page. Personal information on the subscriber can be confirmed only by an area managed by a password. However, as for the information on the consideration, a condition is made so that all members can read. This home page becomes a portal site for the member to confirm the personal information and a generation state of a self-owning facility, and access the page of mutual information exchange between members.

When the electric apparatus production maker T who developed a new electric appliance of environmental consideration type recruits a new product monitor, the maker T hoped to print an advertisement in a home page without using general advertising media. The electric apparatus production maker T considers that there is an effectiveness of advertisement in a case of using a normal advertising media, because a ratio of the person who is interested in a development product is high enough compared to a case of publicizing by a general advertising media. In this way, it is possible that by providing fields of advertisement and promotion through a network of the member, an income is obtained, and an amount thus obtained is returned to the member. Here, although the electric appliance of environmental consideration type is taken as an example to explain, the advertisement of other added or new generation facility would also be effective. In addition to advertisement charges, the profit can be produced by performing a questionnaire to members having commonality from the viewpoint that their hobbies and tastes are related to environment, and selling obtained results.

In the above-described embodiment, although the photovoltaic generation facility is explained as an example of the generation facility using natural energy, the system of the present invention can also be applied to the case using other generation facility such as stand-alone power generating systems including a fuel cell and a gas engine, wind generating power, generation by biomass, and microhydraulic power generation using natural energy, which are given as examples of the generation facilities with small environmental load.

The power value is different depending on the system adopted and when such generation facilities are mixed, it is possible to determine a coefficient of the value of the generation facility, calculate the value from the information on the kind of the generation facility, and mix various generation facilities in the same system.

In addition, the value of the power consumption by self-generation of the aforementioned generation system fluctuates by a balance of supply and demand. For example, as for the generating power of the afternoon of the summer when a peak of power demand occurs, it is thought that the value is higher than that of the other time.

Further, it is preferable to highly evaluate the power sold in the afternoon of summer. Alternately, it is possible that the power company makes various kinds of rate plans to discount power usage rate, in accordance with the power quantity sold at this time.

By an entry of a new power trader, there is a possibility that a difference comes out in the consideration set to the power of the same season and time zone, among a plurality of traders.

In such a case, it is preferable to update the information stored in the value data storage section 406 each time, to flexibly respond to a fluctuation and difference of the power value, without fixedly setting the power value beforehand.

In this way, when the power value is fluctuated in accordance with various circumstances, the subscriber's consciousness of energy saving and energy creation can be raised more, and mutual profits of the subscriber and the trader can be more properly obtained, and further the introduction of the generation facility using natural energy can be expedited.

Moreover, from the viewpoint of the spread of the generation facility with small environmental load and the generation facility using natural energy, it is necessary for many users to set the generation facility itself. However, at present, a large amount of fund is necessary for the introduction of the facility. Therefore, although indirectly, the spread of the generation facility using natural energy can be realized, by forming the management system of injecting the fund for the facility introduction of a third person and giving the consideration to the injection fund, and the management system of converting the participation number of times in an energy-saving related event or the use number of times and a used amount of money of the building in which the self-generated facility is installed, into the power quantity and the points determined by the corresponding power quantity, and giving the points at the time of the value acquisition.

The invention claimed is:

1. A generation facility management system comprising a generation facility with small environmental load and a management server for managing power information on said generation facility, wherein
said generation facility includes:
a power generating section for generating power;
an information control section for creating consumed power information including generated power information on the power generated by the power generating section and consumed power information including information specifying a power consumption and a consumption form of the power, the generated power information relating to a method of generating the power; and
a communication section for transmitting said generated power information and said consumed power information to said management server, and
said management server includes an information management section for determining a consideration for the power information transmitted from said generation facility by using predetermined consideration information.

2. A generation facility management system comprising a generation facility using natural energy and a management server for managing power information on said generation facility, wherein
said generation facility includes:
an energy obtaining section for obtaining natural energy;
a power generating section for generating power from the obtained natural energy;
an information control section for creating consumed power information including generated power information on the power generated by the power generating section and consumed power information including information specifying a power consumption and a consumption form of the power, the generated power information relating to a method of generating the power; and
a communication section for transmitting said generated power information and said consumed power information to said management server, and
said management server includes an information management section for determining a consideration for the power information transmitted from said generation facility by using predetermined consideration information.

3. The generation facility management system according to claim 1, wherein said generated power information includes information for distinguishing among photovoltaic power generation, wind power generation, microhydraulic power generation, generation by a fuel cell, generation by a gas engine and biomass power generation, and said consumed power information includes information for distinguishing between consumption using the power generated by said power generating section and consumption by reverse power flow to a power system.

4. The generation facility management system according to claim 1, wherein said consideration information includes the predetermined consideration for each power distinguished by said generated power information and consumed power information and a condition for obtaining the consideration, and, when the power information transmitted from said generation facility satisfies the condition for obtaining the prescribed consideration, said information management section determines to give the consideration corresponding to the condition.

5. The generation facility management system according to claim 1, wherein the power information transmitted to said management server includes at least one of generation form information, generation time zone information, consumption distinction information, and identification information on the generation facility.

6. The generation facility management system according to claim 1, including a means for offsetting integral values of power quantity consumed by a user possessing the generation facility or a possession facility of a third person contracting with the user possessing it, and all or a part of power quantity used by an intender intending to acquire a value.

7. A generation facility management system comprising a generation facility with small environmental load and a management server for managing power information on said generation facility, wherein said generation facility includes:
- a power generating section for generating power; and
- a communication section for transmitting consumed power information and generated power information on the power generated by the power generating section to said management server, the generated power information relating to a method of generating the power, and
- at least one of said generation facility, management server, and a network terminal includes an information management section for determining a consideration for said generated power information and consumed power information by using predetermined consideration information.

8. A generation facility management system comprising a generation facility using natural energy and a management server for managing power information on said generation facility, wherein said generation facility includes:
- an energy obtaining section for obtaining natural energy;
- a power generating section for generating power from the obtained natural energy; and
- a communication section for transmitting consumed power information and generated power information on the power generated by the power generating section to said management server, the generated power information relating to a method of generating the power, and
- at least one of said generation facility, management server, and a network terminal includes an information management section for determining a consideration for said generated power information and consumed power information by using predetermined consideration information.

9. A generation facility management system comprising at least a generation facility with small environmental load and a management server for managing power information on said generation facility, and having a power generating function to generate power; a storage function to store the power information on generation and consumption of the generated power, the power information relating to a method of generating the power, and an information management function to determine a consideration for said power information on generation and consumption of the generated power by using predetermined consideration information.

10. A generation facility management system comprising at least a generation facility using natural energy and a management server for managing power information on said generation facility, the power information relating to a method of generating the power, and having an energy obtaining function to obtain said natural energy, a power generating function to generate power from the obtained natural energy, a storage function to store the power information on generation and consumption of the generated power, and an information management function to determine a consideration for said power information on generation and consumption of the generated power by using predetermined consideration information.

* * * * *